(12) United States Patent
Rake et al.

(10) Patent No.: US 8,413,533 B2
(45) Date of Patent: Apr. 9, 2013

(54) OPERATING DEVICE HAVING FORCE FEEDBACK

(75) Inventors: Ludger Rake, Diepholz (DE); Andreas Giefer, Lemförde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 12/945,289

(22) Filed: Nov. 12, 2010

(65) Prior Publication Data

US 2011/0056318 A1    Mar. 10, 2011

Related U.S. Application Data

(63) Continuation of application No. PCT/DE2009/050020, filed on Apr. 8, 2009.

(30) Foreign Application Priority Data

May 15, 2008  (DE) .......................... 10 2008 001 805

(51) Int. Cl.
| | |
|---|---|
| B60K 17/04 | (2006.01) |
| B60K 17/12 | (2006.01) |
| B60K 20/00 | (2006.01) |
| F16H 59/04 | (2006.01) |

(52) U.S. Cl.
USPC ...................................... 74/473.12; 74/473.3

(58) Field of Classification Search ............... 74/473.1, 74/473.12, 473.3; 200/61.88; 705/51
See application file for complete search history.

(56) References Cited

U.S. PATENT DOCUMENTS

| | | | |
|---|---|---|---|
| 4,986,689 A | 1/1991 | Drutchas | |
| 6,339,419 B1 | 1/2002 | Jolly et al. | |
| 6,373,465 B2 | 4/2002 | Jolly et al. | |
| 6,679,809 B2* | 1/2004 | Kato et al. | 477/115 |
| 7,257,476 B2 | 8/2007 | Shimamura et al. | |
| 7,829,805 B2 | 11/2010 | Ersoy et al. | |
| 2001/0052893 A1 | 12/2001 | Jolly et al. | |
| 2004/0139815 A1 | 7/2004 | Shimamura et al. | |

(Continued)

FOREIGN PATENT DOCUMENTS

| | | |
|---|---|---|
| DE | 198 48 191 A1 | 4/2000 |
| DE | 100 03 796 C2 | 9/2001 |

(Continued)

OTHER PUBLICATIONS

International Search Report dated Jul. 22, 2009.

*Primary Examiner* — Justin Krause
(74) *Attorney, Agent, or Firm* — Norris McLaughlin & Marcus, P.A.

(57) ABSTRACT

An operating device for a gear-changing transmission operated by shift-by-wire is disclosed. The operating device includes an operating element, rotatably or pivotally supported in a bearing position having a position sensor device, and a device for producing force-feedback. The force-feedback device includes an adjustable counterforce element acting on the operating element, wherein the counterforce element comprises a fluid having controllably variable viscosity. The operating device including the counterforce element is produced by a bearing gap of the bearing position of the operating element, with the bearing gap being filled with the fluid. A space-saving integration of the counterforce element of a force-feedback device is enabled into the joint of an operating lever. Thus, the cost, structural complexity, and installation space required for an operating device having force-feedback is significantly reduced. The haptics of a mechanical operating lever can be realistically emulated.

13 Claims, 2 Drawing Sheets

U.S. PATENT DOCUMENTS

Figure 1:
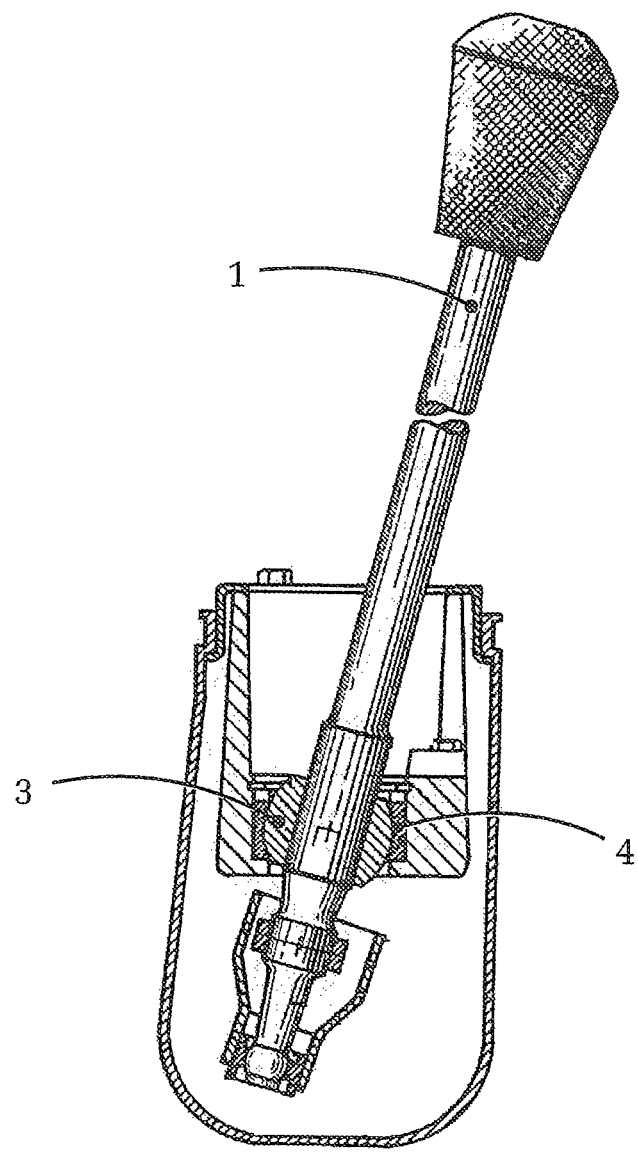

| | | |
|---|---|---|
| 2008/0078604 A1 | 4/2008 | Ersoy et al. |
| 2008/0295633 A1 | 12/2008 | Giefer et al. |
| 2009/0312918 A1 * | 12/2009 | Aubert Sol-Morales et al. .............................. 701/48 |

FOREIGN PATENT DOCUMENTS

| | | |
|---|---|---|
| DE | 699 11 805 T2 | 5/2004 |
| DE | 10 2004 041 690 A1 | 3/2005 |
| DE | 10 2004 056 800 A1 | 1/2006 |
| DE | 10 2005 021 977 A1 | 11/2006 |
| DE | 10 2005 033 510 A1 | 1/2007 |
| DE | 60 2004 001 880 T2 | 5/2007 |
| DE | 10 2005 060 933 B3 | 6/2007 |
| EP | 1 898 126 A | 3/2008 |
| WO | 2005 036031 A | 4/2005 |

\* cited by examiner

OPERATING DEVICE HAVING FORCE FEEDBACK

This is a continuation application of PCT/DE 2009/050020, filed on Apr. 8, 2009 and claiming priority to DE 10 2008 001 805.8, filed on May 15, 2008.

BACKGROUND OF THE INVENTION

1. Field of the Invention

The invention relates to an operating device for a gear-changing transmission, example for a gearbox or for an automatic transmission with shift-by-wire operation, according to the preamble of claim 1.

2. Description of Related Art

Gear-changing transmissions for automobiles are generally shifted or controlled with an operating device arranged within the reach of the operator. Typically, operating elements, such as shift levers or selection levers are used which are arranged, for example, between the front seats of the automobile or in other areas of the cockpit.

In particular, it required for ergonomic and safety reasons that presently impermissible shift positions or the execution of the required shifting operations is haptically indicated to the operator in form of corresponding shifting resistances or interlocks on the operating lever. Only in this manner can a haptic shifting operation be realized, like an operation the operator is familiar with or used to, for example, from fully synchronized mechanical gearboxes with their rotation speed and vehicle-speed dependent synchronized interlocks, or from conventional operation of an automatic transmission with its locking mechanism and its gear shift locks.

It is therefore always necessary to transmit to the operator during operation of the transmission an unambiguous tactile feedback about the actual shifting or operating state of the transmission or about the shifting success. However, with electrical or shift-by-wire operation of gear-changing transmissions, there is no longer a mechanical coupling between the operating lever in the passenger compartment and then automobile transmission in the engine compartment. Instead, the shifting commands are transmitted from the operating device to the automobile transmission in the "shift-by-wire" transmission by way of electrical or electronic signals and subsequent predominantly electro-hydraulic conversion of the shifting commands on the transmission. Due to the absence of a mechanical linkage between the transmission actuators and the operating lever, the position of the transmission, any gear shift locks or impermissible shifting commands can no longer provide direct feedback about the position of the operating lever so that it can be sensed by the operator.

For example, with shift-by-wire-controlled transmissions, the driver is unable to easily recognize based on certain shifting positions which are perceptibly blocked on the operating lever that shift lever positions, gear positions and/or shifting commands may not be allowed under the current driving conditions and should therefore also not be selected. Likewise, with a shift-by-wire actuation, the actual execution of the operator's shifting commands by the transmission is also not fed back to the operating lever, so that the operator is unable to receive the haptic sensation when the shifting operation is executed, in the same way he is used to, for example, from mechanically operated gearboxes with their locking mechanism and gear synchronizing locks.

Depending on the position of the gear-changing transmission to be operated and depending other conditions on the automobile—e.g., engine rpm, vehicle speed, clutch position, etc.—, it is therefore necessary for realizing the required haptic feedback with shift-by-wire-controlled transmissions to actively and controllably limit or totally block the movement of the operating lever depending on the state of the transmission.

Only in this way can the operator receive haptic feedback, when he touches the operating lever, with a shift-by-wire-controlled transmission indicating that the intended gear shifting operation—based on the actual vehicle speed or based on a current operating state of the gear-changing transmission—it is not permitted and therefore blocked. In this way, impermissible shifting commands which are recognized by the electronics unit of the transmission and therefore not transmitted from the operating device to the transmission can be prevented from being engaged on the operating lever.

Such actuating mechanism on the operating lever is also required if the operator should be able to receive with a shift-by-wire-controlled transmission the same haptic feedback as with a mechanically operated transmission, such as for example a manual gearbox with a linkage, where engagement of the individual gears on the shift lever generates perceptible counterforces on the operating lever, particularly rpm- and speed-dependent counterforces.

DE 10 2004 041 690 A1 discloses an electric switch, in particular in form of a joystick or cursor switch. The switch has an operating member which cooperates with movement means such that the operating member is adjustable, in particular rotatable, displaceable, pivotable and the like. The movement means is operatively connected with a magneto-rheologically and/or electro-rheologically operating device such that a haptics, in particular a changeable haptics, is produced for the adjustment movement of the operating member. When the operating member is adjusted, the movement means acts on a sensor element to provide a signal and/or for switching.

WO 2005/036031 A1 describes a manual operating mechanism with a lever and an operating element, with each having at least one gear tooth, wherein the gear teeth mesh and can be operated so that they transmit to the operating element a movement of the lever, wherein the meshing gear teeth define a gap occupied by a magneto-rheological fluid, wherein the mechanism further includes one or more magnetic coils which are configured to generate an electromagnetic field in the region of the magneto-rheological fluid and thereby change its viscosity.

To reduce the installation height of a selection lever, in particular of the "shift-by-wire" type, it is known from DE 10 2005 060933 B3 to support the selection lever rod (1) in a housing (10) via a first (2) and a second (3) shaft, which are spatially separated, extend perpendicular to each other and are each displaceable in the axial direction. It then becomes possible to arrange haptic elements stationarily relative to the selection lever rod. Haptic elements may be, for example, also magneto-rheological dampers.

As shown, for example, in DE 198 48 191 A1, attempts have been made in the state of the art to realize a haptics in an operating element for a gear-changing transmission by providing the operating element with an electronically controllable force generating element and/or motion damper which is controlled by a control device, so that the counterforces which accompany the respective state changes in the gear-changing transmission can be simulated on the operating element while the operator operates the operating element.

However, this operating device known from the state-of-the-art with an electronically controllable motion damper has disadvantages because the motion damper according to the teaching of this document must be incorporated as an additional assembly in the region of the operating lever or in the housing of the operating device. This increases the complexity of the structure and requires a separate installation space which is frequently not available with the increasingly smaller operating devices for modern automobile transmissions. In addition, according to the teaching in this document, generation of the restoring force in this document also requires an actuator drive, resulting in not insignificant energy consumption and requiring additional space.

With this background, it is an object of the present invention to provide an operating device with a force-feedback device for haptic simulation—in particular for electric or electronic shift-by-wire operation of a gear-changing transmission—which is able to overcome the aforementioned disadvantages of the state-of-the-art. The operating device should take up little space, have a simple construction and low manufacturing cost. In addition, a reliable and realistic emulation of the haptics of a mechanically locking operating lever should be made possible.

BRIEF SUMMARY OF THE INVENTION

The object is attained with an operating device having the features of claim 1.

Preferred embodiments are recited in the dependent claims.

In a conventional manner, the operating device according to the present invention includes a base housing and an operating element, for example an operating lever, wherein the operating element is rotatable and/or pivotable about a bearing position arranged on the base housing. In an also conventional manner, the operating device has a force-feedback device which includes an electronically controlled, adjustable element for generating counterforces which act on the operating lever, wherein this counterforce element contains a fluid with a controllably variable viscosity.

However, according to the invention, the operating device is characterized in that the counterforce element is formed by a bearing gap of a bearing position of the operating element, wherein the gap is filled with the fluid.

Is this way, the counterforce element in form of a controllable damper device otherwise required as a separate component in conventional devices can be eliminated, and the function of the counterforce element can be integrated into the joint of, for example, an operating lever, saving considerable installation space. The costs, complexity of the structure and required installation space for an operating device with force-feedback can hence be significantly reduced with the invention.

The invention can be implemented regardless of how the joint of the operating element is constructed or arranged in the base of the operating device, as long as the fluid-filled bearing gap required for implementing the counterforce element can be realized. According to a particularly preferred embodiment of the invention, the bearing position of the operating element is formed by a ball joint with a ball and a ball socket, wherein the bearing gap filled with the fluid is defined by the surfaces of the ball and the ball socket. Preferably, the ball of the ball joint is connected with the operating element, whereas the ball socket is connected with the base housing of the operating device.

This embodiment has the particular advantage that in principle all movements or shift patterns for the operating element can be realized. In other words, it not only becomes possible to simulate the haptics of a mechanical operating lever with only a single counterforce element integrated in the ball joint of the operating lever along a single operating direction (one-dimensional), but along any number of operating directions (two-dimensional).

It then becomes possible—in particular for the range of the shift lever or selection lever for gear-changing transmissions—, to realize with such operating element arbitrary shift patterns entirely with software and to emulate the haptics in a freely programmable manner. One and the same operating device can hence selectively provide to the operator the haptics of the operation of a conventional transmission with several shift channels arranged next to each other, or the haptics of the selection lever of an automatic transmission with the shift lever positions arranged mainly along a single shift channel. The operating element can then also be switched back and forth between, for example, a gearbox and an automatic transmission only by software according to the operator's preference. Other shift patterns, such as for example a touch operation/step shift or continuous shift can also be realized in this manner.

To this end, only the position and the respective movement direction of the operating element or selection lever needs to be determined in real-time, and the counterforce element—meaning the fluid-filled ball joint—needs to be controlled depending on these two values, giving the operator the impression of a mechanical gear shifting gate or the impression of a correspondingly limited movement of the operating lever. If the operator moves the operating element along a permitted direction (meaning, for example, along one of the simulated gear shift channels of a conventional gear operation), then the ball joint is controlled so as to generate no or only small counterforces, whereas in an attempt of a movement transverse to the permitted direction, higher counterforces are immediately produced in the ball joint by the controller. Likewise, in a permitted movement along one of the (simulated) gear shifting channels, locking of a mechanical shift or selection lever can be simulated by haptically transmitting to the operator the different locking steps or locking positions during the movements of the operating element. In this way, the selection lever interlocks that depend on the driving conditions can also be flexibly realized in an automatic transmission of an automobile, without requiring dedicated mechanical locking devices in the region of the selection lever.

Instead of preventing an impermissible movement of the operating element by blocking the operating element—or by generating strong counterforces in the joint of the operating element—, the counterforce element can also be controlled by pulsating the operating element if an impermissible movement is attempted. In this way, the operator receives sensory haptic information that the intended operation cannot be executed in the instantaneous state of the system or that the operator is attempting to move the operating element in an impermissible direction.

The invention can initially be implemented regardless of the way and the physical effect by which they viscosity of the fluid is changed. For example, but not exclusively, an electro-rheological fluid can be used with a viscosity that can be changed depending on an applied electric field.

However, according to a particularly preferred embodiment of the invention, a magneto-rheological fluid is used. A coil assembly for producing a magnetic field is here arranged in the bearing gap of the ball joint. The use of a magneto-rheological fluid and a coil assembly is advantageous in that the desired adjustable counterforce can be particularly easily and reliably generated—based on the magneto-rheological principle.

According to another preferred embodiment of the invention, the bearing position is again formed (as described above) by a ball joint. However, the coil assembly is here used to generate at least two independently controllable magnetic fields, wherein the two independently controllable magnetic fields have substantially mutually perpendicular magnetic field directions. The combination of a counterforce element implemented as a ball joint with two independently controllable magnetic fields oriented along different spatial directions is advantageous in that different counterforces for different movement directions can thereby be generated simultaneously. For example, the operating element or the selection lever can be guided along the (virtual) gear shifting gate without noticeable resistance, whereas simultaneously lateral movements transverse to the gear shifting gate can be prevented by correspondingly higher lateral counterforces on the lever.

Instead of using several independently controllable magnetic fields for different movement directions, the movement of the operating element along an impermissible direction (for example transversely to a shift channel) can also be prevented mechanically, for example with a gear shifting gate. In this case, the counterforce element is mainly responsible for generating the typical locking and/or shift force paths, optionally also for blocking actual impermissible lever positions.

According to another preferred embodiment of the invention, the operating device is characterized in that the force-feedback device also includes a motor-driven actuator. Advantageously, not only counterforces can thereby be generated on the operating element, but the operating element can additionally also be moved actively with the actuation mechanism. The latter operation can be important, in particular, when the operator releases the operating element in a position that does not correspond to the (virtual) locking positions; or when the operating element—for example in the case of a parking lock that is automatically engaged with Auto-P—should track the changed shift state of the transmission.

The adjustable counterforce element of the force-feedback device is—for example by using a control curve field—preferably configured for generating counterforces counteracting the manual forces applied by the operator. The motor-driven actuator, however, is—also based on the control curve field—preferably configured exclusively for actuator-driven movement of the operating lever. In this way, the tasks between the force generating element and the motor-driven actuator are divided such that counterforces on the operating element are generated exclusively by the force generating element and the actuator-driven movement of the operating element is generated exclusively by the motor-driven actuator.

Unlike in the aforedescribed state-of-the-art, the actuator is therefore—in the sense of a force-feedback—not used to generate the counterforce (because of counterforce is generated according to the invention with the counterforce element in the lever support), but is used exclusively as an actuator to actively move the operating lever (in the absence of most other forces).

In this way, the entire haptics of a mechanical operating lever can be realistically and practically simulated and replicated. In particular, by combining the adjustable force generating element with the actuator, the haptics of a mechanical locking mechanism of the operating element can also be quite realistically emulated, although such mechanical locking mechanism does actually not exist. The adjustable force generating element is here specifically responsible for generating realistic counterforces of the locking mechanism of the operating element (or of the counterforces of a vehicle transmission), whereas the actuator is responsible specifically for a realistic spring return of the actuating lever into the recesses of the virtual locking gate, as soon as the operating lever is released or as soon as significant forces are no longer applied by the operator on the operating lever.

This also advantageously minimizes energy consumption for actuators and haptic emulation of an operating lever, while simultaneously reducing the size of the actuator. Because unlike in the state-of-the-art, the actuator is here only used to generate movements of the operating lever, and not to generate significant counterforces on the operating lever, since all counterforces countering the operating forces applied by the operator can in practice be generated exclusively by the controllable force generating element.

As soon as the operator no longer applies significant operating forces on the lever or releases the lever, the control can immediately be switched by the controller and the stored curve field from the force generating element to the motor-driven actuator, and a return of the operating lever into the nearest recess of the (in actuality nonexistent) locking gate of the transmission or of the operating device can be simulated with the motor-driven actuator. The braking forces that must be applied when the operating lever returns to the recess of the virtual locking gate and the motion damping required until the operating lever comes to rest can here also be generated by the force generating element.

For example, an operating lever can now be provided with a variable locking characteristic, where not only the stiffness of the locking characteristic, but also the number of locking recesses as well as their mutual spacing can be variably and freely adjusted using only software or by selecting a corresponding curve field for controlling the counterforce element and the motor-driven actuator.

For example, both the number of locking points and their spacing and stiffness can be adjusted with software according to the preference of the respective user or operator. Both the force-distance curve of the locking characteristic and the characteristic of the selection lever haptics, for example for a gear box or an automatic transmission, can be designed in this manner only with software and are freely programmable. Either the force generating element for generating counterforces (as long as the operator exerts manual forces on the lever) or the motor-driven actuator (as long as the operator does no longer apply significant manual forces on the lever and the lever therefore has to return to one of its locking positions) can be controlled with the stored curve field.

An operator can then be provided upon request or preference at one time with the haptics of a mechanically operated gearbox and at another time with the haptics of an automatic transmission or a continuous transmission.

The force generation with the counterforce element can also be supported by the motor-driven actuator. In this situation, the actuator is responsible for automatic movements of the operating element (for example for a realistic return of the selection lever to its locking position) and also for supporting the generation of a counterforce, for example for the haptic simulation of a locking mechanism, or in the event that actually impermissible selection lever positions must be blocked.

The invention can be implemented regardless of the construction or arrangement of the actuator. According to a preferred embodiment, however, the actuator of the operating device is an electric servo-gear motor or a linear servo actuator, potentially resulting in a space-saving, robust and cost-effective design. Because the actuator is only responsible for the movement or actuator-driven return of the operating lever into the (virtual) recesses of the locking gate, while the task of generating counterforces can be assumed exclusively by the controlled force generating element, a relatively small and lightweight actuator can now be used, unlike in the state-of-the-art.

According to another preferred embodiment of the invention, the counterforce element and/or the actuator is also configured for generating vibrations. In this way, noticeable vibrations can be introduced into the operating element, either in form of active vibrations generated by the actuator or—as soon as the operator tries to attempt an impermissible movement—as passive pulsations in form of a periodic, rapidly varying damping characteristic of the counterforce element. The operator or driver can then be warned, for example, if an attempt is made to perform impermissible shifting operations under current driving conditions of an automobile or during the instantaneous operating state of an automobile transmission.

BRIEF DESCRIPTION OF THE SEVERAL VIEWS OF THE DRAWING(S)

The invention will now be described in more detail with reference to drawing which only illustrates exemplary embodiments. It is here shown in FIG. 1 in a schematic partial cross-sectional view an operating lever with a ball joint according to the state-of-the-art; and FIG. 2 in a schematic cross-sectional view the operating principle of an embodiment of the operating device according to the present invention, with an adjustable force generating element and actuator.

DETAILED DESCRIPTION OF THE INVENTION

FIG. 1 shows first a conventional operating lever 1 with a ball joint according to the state-of-the-art. As is clearly evident, the operating lever 1 includes a ball joint with a ball 3 and a ball socket 4. The operating lever 1 can hence be initially pivoted about the ball joint in all directions within its movement range.

Figure 2:
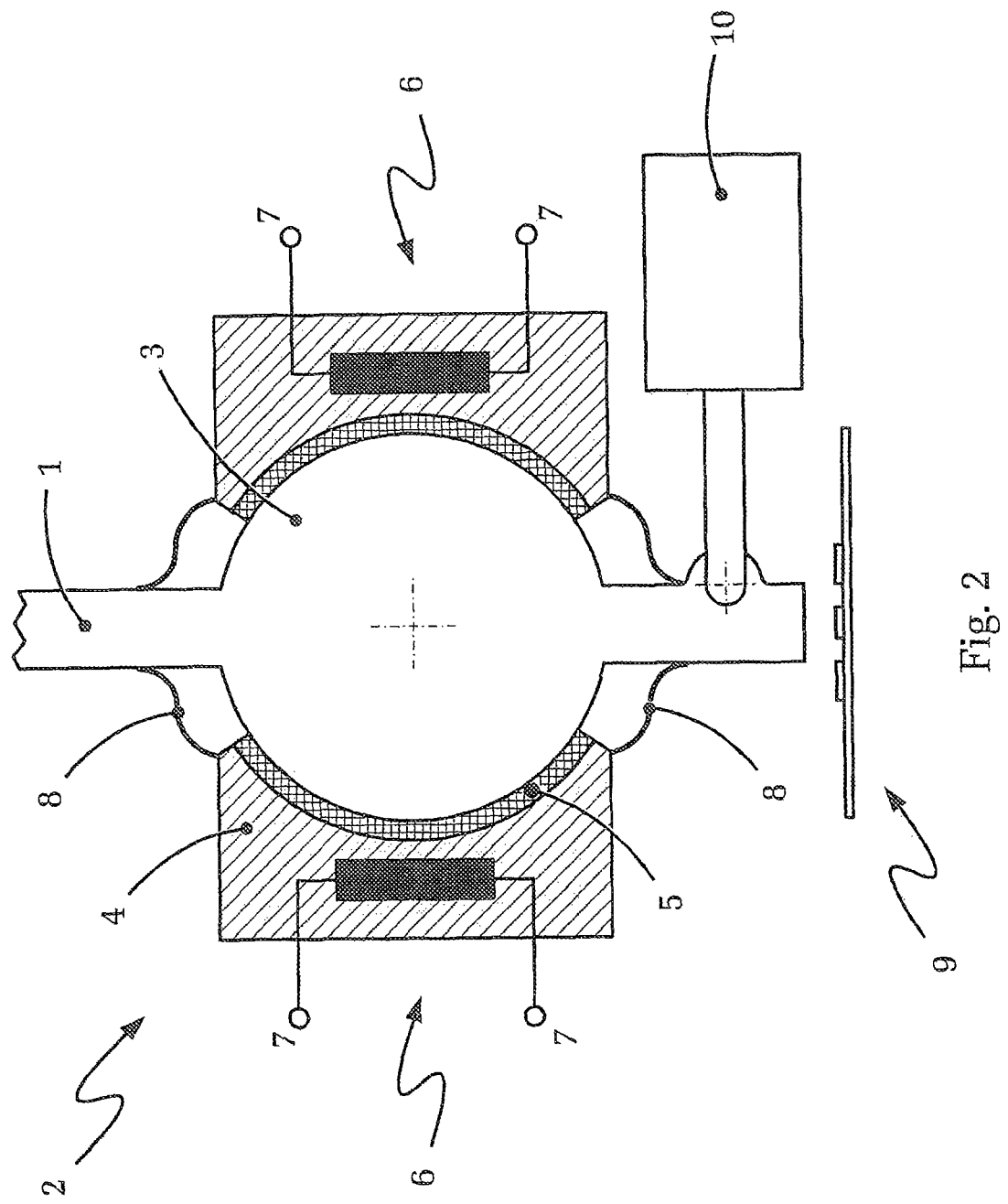

FIG. 2 shows in a highly schematic diagram a ball joint, which basically corresponds to the ball joint of FIG. 1, of an operating device according to the present invention.

FIG. 2 shows again an operating lever 1 of which only a portion (its lower region and the joint region, respectively) is illustrated. The operating lever 1 is again connected with an (unillustrated) base of the operating device by way of a bearing constructed in form of a ball joint. The ball joint according to FIG. 2 includes the ball 3 arranged on the operating lever 1 and the ball socket 4 connected with the (unillustrated) base.

According to the invention, the illustration of FIG. 2 includes also a controllable counterforce element 2 and additionally an actuator 10 acting on the operating lever 1. A bearing gap 5 of the ball joint is located between the outer surface of the ball 3 and the inner surface of the ball socket 4. In the exemplary embodiment illustrated in FIG. 2, the bearing gap 5 is filled with a magneto-rheological fluid. The magneto-rheological fluid is configured so that its viscosity can change depending on the strength of a magnetic field acting on the fluid.

For generating the magnetic field required to change the viscosity of the magneto-rheological fluid, a magnetic coil assembly 6 is disposed in the region of the ball socket 4—which like the ball 3 is preferably made of plastic so as not to hinder the propagation of the magnetic field. A magnetic field variable over a wide range can then be generated in the region of the bearing gap 5 and the fluid, respectively, by introducing electric current into the terminals 7 of the magnetic coil assembly 6. In this way, the mechanical damping of the ball joint can be controlled variably and in real-time over a considerable range—for example, by control software—, by adjusting the fluid with the magnetic field of the magnetic coil assembly 6 between low viscosity (effortless movement of the ball 3 and the operating lever 1, respectively) and high viscosity or nearly solid (high resistance against movement of the ball 3 and/or blocking of the operating lever 1, respectively).

For protecting the magneto-rheological fluid, the ball joint has a corresponding elastic sealing bellow 8 in the region of each of the two openings for the operating lever 1. A sensor mechanism, which is schematically illustrated in FIG. 2 as a circuit board 9, is provided to allow control electronics of the operating device to determine the actual position of the operating lever.

In the embodiment of the operating device illustrated in FIG. 2, an actuator 10 is provided in addition to the counterforce element 2 formed by the magnetorheological fluid. The actuator 10 is used for software-controlled, active actuator-driven movement of the operating lever 1. The operating lever 1 can be automatically moved with the actuator 10 into a certain lever position, for example in the event of Auto-P, meaning the parking lock which is automatically engaged when exiting the vehicle.

The actuator 10 can also be used for supporting a particularly realistic emulation of the haptics of a locking mechanism for a selection lever. The counterforce element 2 formed by the magneto-rheological fluid in the ball joint 3, 4 is here used to simulate the counterforces which a mechanical locking mechanism would produce in operation, while the actuator 10 simulates the realistic return of the operating lever to the respective center positions of the locking mechanism when the operating lever 1 is released.

The counterforce element 2 it is therefore responsible for the simulation of the counterforces generated by a locking device or in the transmission—optionally causing the operating lever 1 to be blocked for impermissible shifting commands—and including generation of corresponding pulsations for impermissible movement of the operating lever. Conversely, the actuator 10 preferably commences operation only when the operating lever 1 must be moved without the operator or driver applying noticeable forces on the operating lever 1. This is particularly the case when the lever 1 is released while it is not exactly in a (virtual) locking position. In this case, the actuator 10 is controlled by the control electronics of the operating device so that the operating lever 1 is returned the actuator 10 to the center of the corresponding virtual locking position. In this way, the actions of a mechanically locking operating lever can be presented to the operator or driver, although mechanical locking does in actuality not exist.

The actuator 10 can also be used to guide the operating lever 1 into the correct shift position if there should be for some reason a discrepancy between the shift position of the operating lever 1 and the actual shift position in the transmission. This may occur, for example, if the parking lock was automatically applied in the transmission via Auto-P—for example when the ignition key is removed or when exiting the automobile—because the driver may have forgotten to engage the parking lock manually. In this case, the operating lever 1 is automatically moved by the actuator 10 into the parking lock position, so that when the driver returns to the vehicle, the shift lever position agrees with the parking lock that was automatically set in the transmission even if the selection lever was previously left by the driver in a driving position.

The embodiment illustrated in FIG. 2 can also be used to represent the haptics of a mono stable operating lever. In this case, the combination on the force generating element 2 and the actuator 10, on one hand, is used for the realistic simulation of the locking mechanism and, optionally, of the shift locks or shift resistances in the operating device or in the transmission. On the other hand, the actuator 10 can here also be used to return the operating lever 1 after excursion from the neutral position and after release again to the neutral position, corresponding to the behavior of a mechanical monostable operating lever.

Both elements—i.e., the counterforce element 2 and the actuator 10—in combination and controlled by common control electronics hence make it possible to realistically and faithfully emulate any desirable selection lever locking and/or shift patterns only with software.

As a result, an operating device with force-feedback can be provided by the invention, in particular for shift-by-wire-operated gear shifting transmissions, which make it possible to offer the driver the actions of a mechanically locking operating lever with very little structural complexity, although a mechanical locking mechanism is actually nonexistent. In addition, the virtual locking mechanism can be freely and controllably varied with respect to the number and the distance of the locking points, as well as with respect to the stiffness of the locking mechanism, or noticeable pulsations can be introduced into an operating element as feedback. In this way, the haptics and the movement characteristic of an operating device for a gear-changing transmission can be varied over a wide range with software alone and adapted to the user preferences. Even exclusively software-controlled switching of the haptics of an operating device, for example, between an automatic selection lever and a shift lever for a classic gearbox by can be realized.

The invention therefore makes a significant contribution for improving the effective installation space and costs, the ergonomics and the operating comfort, in particular for demanding applications in the field of operating transmissions of automobiles; and therefore also represents a significant step towards the goal of replacing complex mechanical components with software.

The invention claimed is:

1. An operating device for selecting shifting steps for a shift-by-wire gear-changing transmission, the operating device comprising
a base housing and an operating element (1), which is rotatably or pivotally supported in a bearing position (3, 4),
a position sensor device (9) and a force-feedback device,
wherein the force-feedback device comprises an adjustable counterforce element (2) acting on the operating element (1), the counterforce element (2) comprising a fluid having controllably variable viscosity, and wherein the counterforce element (2) is formed by a bearing gap (5) of the bearing position (3, 4) of the operating lever (1), said bearing gap being filled with the fluid, wherein the bearing position is formed by a ball joint with a ball (3) and a ball socket (4) with the fluid being received exclusively within the bearing gap (5) forming a single cavity defined between an outer surface of the ball (3) and an inner surface of the ball socket (4).

2. The operating device according to claim 1, wherein the ball (3) is connected with the operating lever (1) and the ball socket (4) is connected with the base housing of the operating device.

3. The operating device according to claim 1, wherein the fluid with the controllably variable viscosity is a magneto-rheological fluid, wherein a coil arrangement (6) is arranged in the region of the bearing position (3, 4) for generating a magnetic field in the bearing gap (5) of the bearing position (3, 4).

4. The operating device according to claim 3, wherein the bearing position is formed by a ball joint (3, 4), wherein the coil arrangement (6) is constructed for generating at least two independently controllable magnetic fields with substantially mutually perpendicular magnetic field directions.

5. The operating device according to claim 1, a single coil assembly implemented as a ball joint with two independently controllable magnetic fields oriented along different spatial directions.

6. The operating device according to claim 1, wherein the force-feedback device comprises a motor-driven actuator (10).

7. The operating device according to claim 6, wherein the adjustable counterforce element (2) is configured to generate counterforces based on a control curve field, whereas the motor-driven actuator (10) is configured for actuating movement of the operating lever (1) based on the curve field.

8. The operating device according to claim 6, wherein the actuator (10) is an electric servo-gear motor.

9. The operating device according to claim 6, wherein the counterforce element (2) and/or the actuator (10) are configured for generating vibrations.

10. The operating device according to claim 6, wherein the actuator simulates actions of a mechanical locking for the operating lever in its physical absence.

11. The operating device according to claim 6, wherein the actuator commences operation only when the operating lever (1) is to be moved in the absence of operator imposed forces on the operating lever (1).

12. The operating device according to claim 6, wherein the actuator simulates gear shift locks or impermissible shifting commands.

13. The operating device according to claim 6, wherein the actuator is used exclusively for movement of the operating lever simulating spring return of the operating lever (1) into recesses of a virtual locking gate, as soon as the operating lever is released or as soon as significant forces are no longer applied by the operator on the operating lever; while the counterforces are generated exclusively by the controlled force generating element.

* * * * *